United States Patent [19]
Freese et al.

[11] Patent Number: 5,277,472
[45] Date of Patent: Jan. 11, 1994

[54] MULTI-FUNCTION INFANT CAR SEAT INCLUDING GLIDER ASSEMBLY

[75] Inventors: T. Brent Freese, Westminster; Joseph E. Janicke, Eldorado Springs; Roy E. Knoedler, Boulder; Robert M. Parker, Aurora, all of Colo.

[73] Assignee: Gerry Baby Products Company, Denver, Colo.

[21] Appl. No.: 577,433

[22] Filed: Sep. 4, 1990

[51] Int. Cl.⁵ ............................................. A47C 13/00
[52] U.S. Cl. ................... 297/130; 297/256.16; 297/183; 297/329
[58] Field of Search ............ 297/183, 250, 280–282; 297/322; 297/329; 297/130; 5/106

[56] References Cited

U.S. PATENT DOCUMENTS

| | | | |
|---|---|---|---|
| 2,979,735 | 4/1961 | Helmer | 5/109 |
| 3,125,767 | 3/1964 | Griggs et al. | 5/109 |
| 3,648,307 | 3/1972 | Meade | 5/108 |
| 3,653,080 | 4/1972 | Hafele | 5/108 |
| 3,851,343 | 12/1974 | Kinslow, Jr. | 5/109 |
| 4,028,753 | 6/1977 | Rios | 5/108 |
| 4,371,286 | 2/1983 | Johnson, Jr. | 297/183 |
| 4,516,806 | 5/1985 | McDonald et al. | 297/183 |
| 4,580,842 | 4/1986 | Segal | 297/488 |
| 4,598,946 | 7/1986 | Cone | 297/258 |
| 4,620,334 | 11/1986 | Robinson | 5/108 |
| 4,634,177 | 1/1987 | Meeker | 297/250 |
| 4,655,506 | 4/1987 | Wise et al. | 297/467 |
| 4,656,680 | 4/1987 | Wilson | 5/108 |
| 4,664,396 | 5/1987 | Pietrafesa | 297/130 |
| 4,688,850 | 8/1987 | Brownlie et al. | 297/250 X |
| 4,770,468 | 9/1988 | Shubin | 297/487 |
| 4,911,499 | 3/1990 | Meeker | 297/130 |

*Primary Examiner*—James R. Brittain
*Assistant Examiner*—Milton Nelson, Jr.
*Attorney, Agent, or Firm*—Biebel & French

[57] ABSTRACT

An infant seat which functions as an infant carrier, a glider, or a car seat. The car seat includes a base with an upwardly open cavity and a carrier connected to the base and at least partially contained within the cavity. The positioning of the carrier relative to the base may be adjusted to allow the carrier to move relative to the base or to lock the carrier to the base. In a locked configuration, seat belt receivers are properly positioned to receive an automobile seat belt, when the car seat is positioned on the seat of an automobile.

23 Claims, 7 Drawing Sheets

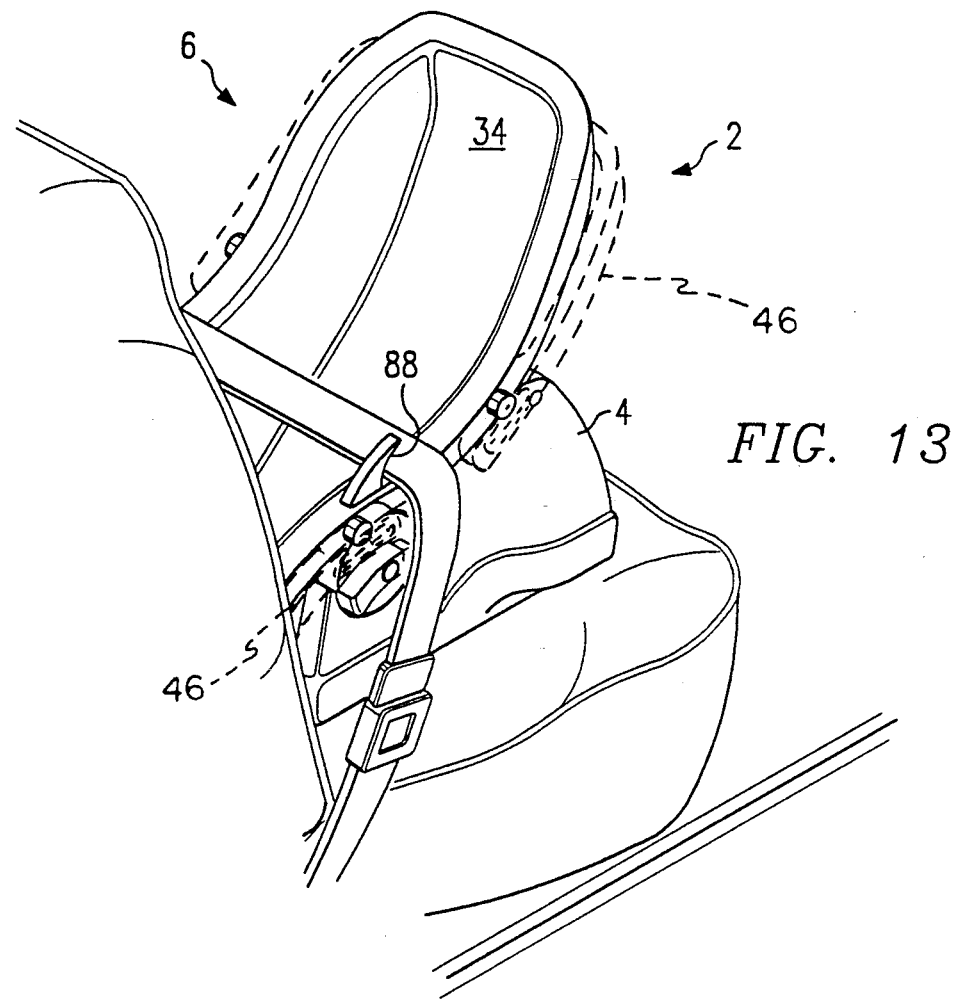
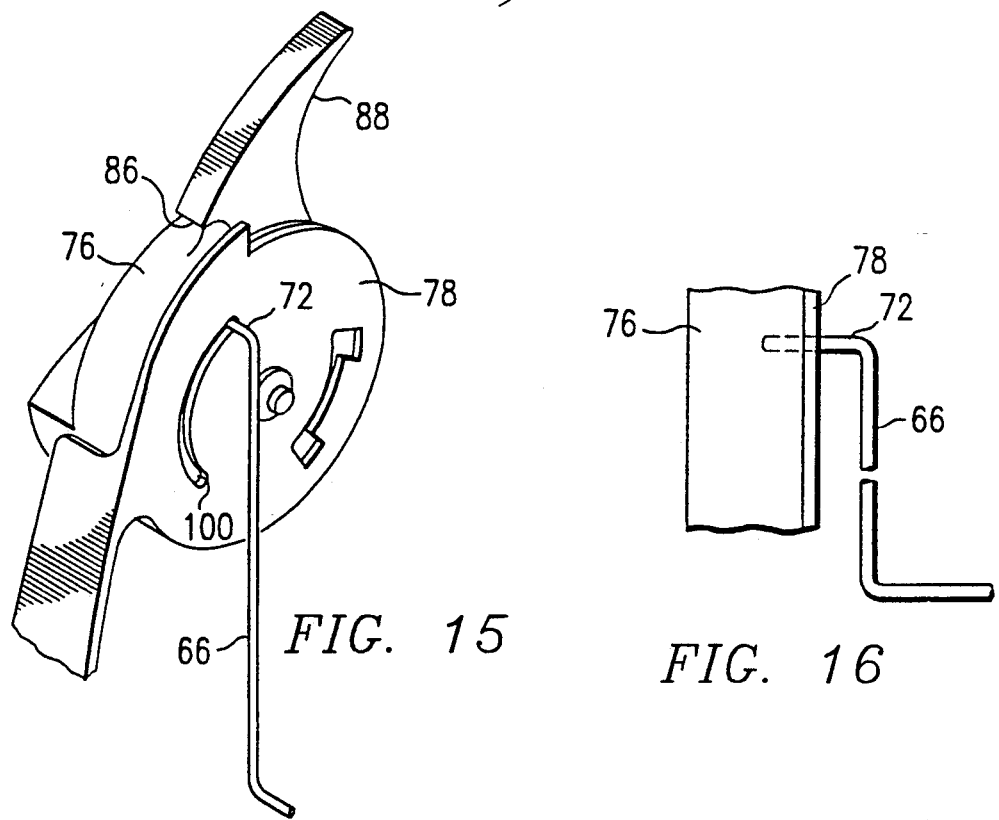

MULTI-FUNCTION INFANT CAR SEAT INCLUDING GLIDER ASSEMBLY

FIELD OF THE INVENTION

The present invention relates to the field of infant seats and, more particularly, to multi-functional infant seats which can function as an infant carrier, a glider and/or a car seat.

BACKGROUND OF THE INVENTION

There are a wide variety of infant seats available on the market today. Notwithstanding this wide variety, all of such infant seats can generally be categorized as either a single function, i.e., one primary intended use, or a multi-functional, i.e., more than one primary intended use, infant seat. Such infant seats can be further categorized based upon the types of functions offered by the particular infant seat.

One type of single function infant seat are those which are primarily designed for use as an automobile safety seat (hereinafter referred to as a "car seat"). A representative sample of this subcategory includes U.S. Pat. No. 4,580,842 to Segal, issued Apr. 8, 1986; U.S. Pat. No. 4,655,506 to Wise et al., issued Apr. 7, 1987; and U.S. Pat. No. 4,770,468 to Shubin, issued Sep. 13, 1988. Each of these references utilize various restraint systems which include some type of harness and frontal barrier to provide an infant seat which will adequately protect its occupant when a passenger of a motor vehicle.

A second type of single function infant seat can be characterized as those being designed for use as a rocker or glider to subject the infant to a soothing motion. This particular subcategory of single function infant seats appears to have evolved from larger types of infant furniture such as cribs, cradles, and bassinets which are primarily designed to contain the infant in a prone position. For instance, cradles have long been used to rock an infant to sleep, the motion being supplied by either the infant's own movements or by the application of a force to the cradle by an individual attending to the infant. However, many of such devices have also incorporated some type of drive mechanism, such as an electric motor or other similar device, to provide the desired motion. A representative sample of these types of "motorized cribs" are U.S. Pat. No. 2,979,735 to Helmer, issued Apr. 18, 1961; U.S. Pat. No. 3,125,767 to Griggs et al., issued Mar. 24, 1964; U.S. Pat. No. 3,648,307 to Meade, issued Mar. 14, 1972; U.S. Pat. No. 4,028,753 to Rios, issued Jun. 14, 1977; and U.S. Pat. No. 4,620,334 to Robinson, issued Nov. 4, 1986. Although each of these references applies some type of motion to a crib or other similar structure, some are merely a driven support surface upon which a "crib" may be positioned, while others provide an assembly where the "crib" and the drive assembly are integrally interconnected.

Possibly due to the popularity of "motorized cribs," while recognizing the somewhat bulky nature of such articles, motorized infant seat rockers were devised. For instance, U.S. Pat. No. 3,653,080 to Hafele, issued Apr. 4, 1972 and U.S. Pat. No. 3,851,343 to Kinslow, Jr., issued Dec. 3, 1974, disclose one type of infant seat rocker. Generally, both Hafele and Kinslow, Jr. disclose the use of a drive mechanism connected to an infant seat by linkages or a frame assembly to, in part, support the infant seat in a reclined position with the seat portion being nearest a supporting surface such as a floor. When the drive mechanisms of Hafele and Kinslow, Jr. are activated, the linkages cause the infant seat to essentially pivot about its lower portion to generate a rocking-type motion. Although such designs generate one type of motion which may be desirable, some of the linkages or other similar connectors are exposed during operation which presents a safety problem if other infants or persons are in the area. The infant seats used with the driver assembly of both Hafele and Kinslow, Jr. appear to only be usable for this limited function as a rocker.

A second type of infant seat rocker is disclosed in U.S. Pat. No. 4,656,680 to Wilson, issued Apr. 14, 1987. The apparatus of Wilson generally includes a base, a carrier support pivotally attached to one end of the base, an infant carrier which is preferably detachable from the carrier support, and a drive mechanism which is attached to the base on the end opposite of the pivotal connection and located between the carrier support and the base. The drive mechanism includes a cam which contacts the underside of the end of the carrier support opposite its pivotal connection to the base. Rotation of the cam by the drive mechanism thereby causes the carrier support, and thus the attached infant carrier, to pivot through a limited range of motion. Although Wilson includes an infant carrier and essentially a detachable base, the base is a cumbersome structure which incorporates a drive assembly and apparently requires a large supporting surface to maintain its stability.

Another variation of an infant seat rocker is disclosed in U.S. Pat. No. 4,911,499 to Meeker, issued Mar. 27, 1990. Meeker discloses a base having an upwardly facing opening defined by the side walls and its end walls, a platform positioned within this opening and pivotally connected to the side walls of the base by generally U-shaped links, and a drive mechanism to move the support relative to the base. The platform is shaped to receive any number of commercially available infant seats, which is allegedly an advantage over some existing rockers which require an infant seat of special construction for use with the rocker mechanism. When an appropriate infant seat is positioned on the platform and a rocking motion is desired, the motor is activated which causes the platform, and thus the attached infant seat, to rock through a limited range of motion by essentially swinging on the U-shaped links. A locking mechanism is also provided which prohibits motion of the platform relative to the base to allow a child to be positioned within an infant seat already on the platform or to allow the rocker to be used as a stationary device. Meeker does not suggest that the entire assembly, i.e., the base, intermediate platform, and infant seat, would be appropriate for use as a car seat.

Although single function infant seats remain a popular choice among consumers, many manufacturers are now offering multi-functional infant seats. The promotion of multi-functional infant seats has centered upon having one article which performs numerous functions to potentially reduce the physical space occupied by such infant accessories and possibly the cost since now one physical unit performs the functions of two physical units. Consequently, a wide variety of combinations of functions are now being offered.

For instance, the Snugli ® Bouncer Infant Carrier, commercially available from Gerry Baby Products Company, is essentially a combination infant carrier and bouncer. In providing these two functions, the structure of the Bouncer Infant Carrier includes a base and a carrier movably connected to the base. Two spring rods establish this movable connection, each having a first portion fixedly attached to the base, a second portion upwardly inclined relative to the base and slidably engaged with the carrier, and a third portion pivotally attached to an adjusting assembly which is in turn rotatably attached to each side wall of the carrier. The pivotal connection is made at a point radially outward from the rotational axis of the adjusting assembly. Rotation of both adjusting assemblies results in the carrier sliding up the inclined portions of the spring rods to increase the distance between the carrier and the base. Due to the inherent flexibility of the spring rods when the carrier is in this position, movements of an infant in the carrier or the application of a force by an individual attending to the infant will produce a bouncing-type motion in substantially a vertical direction. Rotation of the adjusting assemblies in the opposite direction will cause the carrier to slide back down the inclined portions of the spring rods into engagement with the base where the movement of the carrier relative to the base is substantially restricted. In this position, the assembly may be transported by use of handles rotatably attached to the carrier. Although disclosing a combination infant carrier and bouncer, there is no suggestion that the Bouncer Infant Carrier would be appropriate for use as a car seat.

U.S. Pat. No. 4,634,177 to Meeker, issued Jan. 6, 1987, discloses essentially a combination infant carrier and car seat. In order to provide both of these functions, Meeker includes an infant carrier which is detachably connected to a base structure which in turn is detachably connected to the seat of an automobile by its restraint mechanism, i.e., a seat belt. The infant carrier includes a harness to restrain the infant and also a handle for transporting the infant carrier when the carrier is detached from the base. Consequently, the infant carrier may be connected to the base to function as a car seat or it may be detached from the base and transported by the handle to function as an infant carrier. Although disclosing an infant seat and base which function as both an infant carrier and car seat, Meeker does not suggest that the combination could also somehow be used as a rocker. To the contrary, much of the disclosure is directed to the detachable connection between the carrier and base which maintains the carrier and base in a locked position.

U.S. Pat. No. 4,598,946 to Cone, issued Jul. 8, 1986, discloses essentially a combination car seat and rocker. The infant seat is fixedly connected to a planar base by a nut and bolt combination. The material structure of the seat and base, however, is such that it possesses sufficient flexibility to allow the seat to rock about the axis of its cylindrical bottom relative to the base. The infant seat includes open ended slots for receiving a seat belt if positioned in a car and the base has handholds for transporting the assembled unit.

U.S. Pat. No. 4,688,850 to Brownlie et al., issued Aug. 25, 1987, discloses a combination rocker, car seat, carrier, and swing seat. The seat includes a harness and slots for receiving a typical automobile restraint mechanism so that the seat may function as a car seat. The seat also includes a rotatably adjustable handle so that the seat may be easily transported when used as an infant carrier. Furthermore, the seat also includes an adjustable L-shaped linkage connected to the back and bottom portion of the seat to allow the seat to function as a rocker or a stationary seat. When the linkage is placed in a first position, the seat is able to rock since the lowermost section of the linkage is slightly upwardly inclined from where it connects to the seat bottom. When the linkage is placed in a second position, the lowermost section of the linkage is substantially parallel with the seat bottom to substantially restrict any motion of the carrier relative to the supporting surface. Consequently, the linkage is an extension of the infant seat which allows the seat to rock or remain stationary, depending upon its position.

U.S. Pat. No. 4,371,286 to Johnson, Jr., issued Feb. 1, 1983, essentially discloses a combination infant carrier and rocker. The carrier includes a rotatable handle for easy transportation. The contour of the seat bottom is curved to allow the carrier to rock when placed on a supporting surface upon experiencing a suitable driving force. However, the handle may be rotated to extend outwardly from the back of the carrier and towards the supporting surface to restrict or limit the motion of the carrier relative to the supporting surface. Although disclosing a combination infant carrier and rocker, there is no disclosure which suggests that the unit would be suitable as a car seat. Moreover, since no base unit is used, a potential safety hazard is introduced since the rocking motion may tend to pinch a misplaced finger or other body part between the rocker and the supporting surface.

SUMMARY OF THE INVENTION

The infant seat of the present invention is a multifunctional unit which may be used as an infant carrier, glider, or car seat. The present invention utilizes a modular assembly generally including a base having an upwardly open cavity or receiving area and a carrier connected to the base. In a first configuration, the carrier is locked in position relative to the base and carrying handles connected to the carrier are positioned so that the unit can be used as an infant carrier. In a second configuration, the carrier is supported within the cavity of the base by two swing support members positioned between the side walls of the base and is able to move relative to the base to function as a glider. In a third configuration, the carrying handles are connected to the periphery of the carrier and the carrier is immovable relative to the base just as in the first configuration. Seat belt receivers are exposed so that the entire unit can be positioned on the seat of a motor vehicle and be fixedly secured thereto by the restraint mechanism of the motor vehicle.

The base of the present invention has a cavity formed by two laterally displaced side walls and a front and rear wall. The heights of the front and rear walls are less than that of the side walls to define the cavity in which the carrier may be at least partially contained. Positioned on the bottom of the base are a number of rails which run transversely between the side walls. A restraining rail is positioned in the forward portion of the base while two adjacently located supporting rails are positioned near the rearward portion of the base.

The carrier is formed by two laterally displaced side walls, a seat, and a back, which is upwardly inclined from the base of the seat, to define an internal recess in which an infant may be positioned. In order to safely restrain an infant within this recess, a harness mechanism is provided which extends out from the back and is detachably connectable to the seat.

Integrally disposed at the lower, exterior surface of the carrier is a carrier support which is used in maintaining the carrier in an inclined position. The attachment between the base and carrier depends upon whether the unit is to function as a glider or, alternatively, as a car seat or infant carrier. When configured as a glider, the carrier is supported within the base cavity by two swing support members which extend between the side walls of the base. A first swing support member is pivotally attached to the upper, rear corner of the side walls, while a second swing support member is pivotally attached to an adjusting assembly which is, in turn, rotatably attached to the upper, front corner of each of the side walls. The swing support members engage with receiving slots on the bottom of the carrier support to suspend the carrier within the cavity to allow the carrier to move relative to the base and thereby act as a glider. The first swing support member is longer than the second swing support member to achieve the desired swinging or gliding motion. In order to limit the range of motion of the carrier with respect to the base, motion limiters are attached to the inner surfaces of the side walls to limit the rearward motion of the first and second swing support members.

The connection between the carrier and base is modified when the unit is to be used as a car seat or an infant carrier. Rotation of the adjusting assembly lowers the second or front swing support member so that the restraining slot on the carrier support engages with a restraining rail on the bottom of the base to be at least partially supported thereby. This engagement substantially restricts any longitudinal movement of the carrier relative to the base and thus constitutes a portion of the locking assembly. Lowering of the forward portion of the carrier also establishes contact between the supporting rails and the rearward portion of the carrier support to further stabilize the carrier within the base.

The rotation of the adjusting assembly as described above also results in the engagement of a locking notch, which is fixedly attached to the adjusting assembly, with the upper surface of the carrier to substantially restrict the vertical movement of the carrier relative to the base. Furthermore, seat belt receivers fixedly attached to the adjusting assembly are also positioned above the upper surface of carrier by rotation of the adjusting assembly. In this manner, the unit is configured to be positioned on the seat of an automobile where the restraint mechanism of the automobile may pass through the seat belt receivers to secure both the carrier and the base to the seat.

BRIEF DESCRIPTION OF THE DRAWINGS

FIG. 13 is a perspective view of the infant seat held to the seat of a motor vehicle with the infant seat being in the locked configuration;

FIG. 15 is an enlarged perspective view of the adjusting knob showing the front swing support member in the glider position; and FIG. 16 is an enlarged, fragmentary view of portions of the adjusting knob and the engagement between the front swing support member and the base mounting slot.

DETAILED DESCRIPTION

Figure 1:
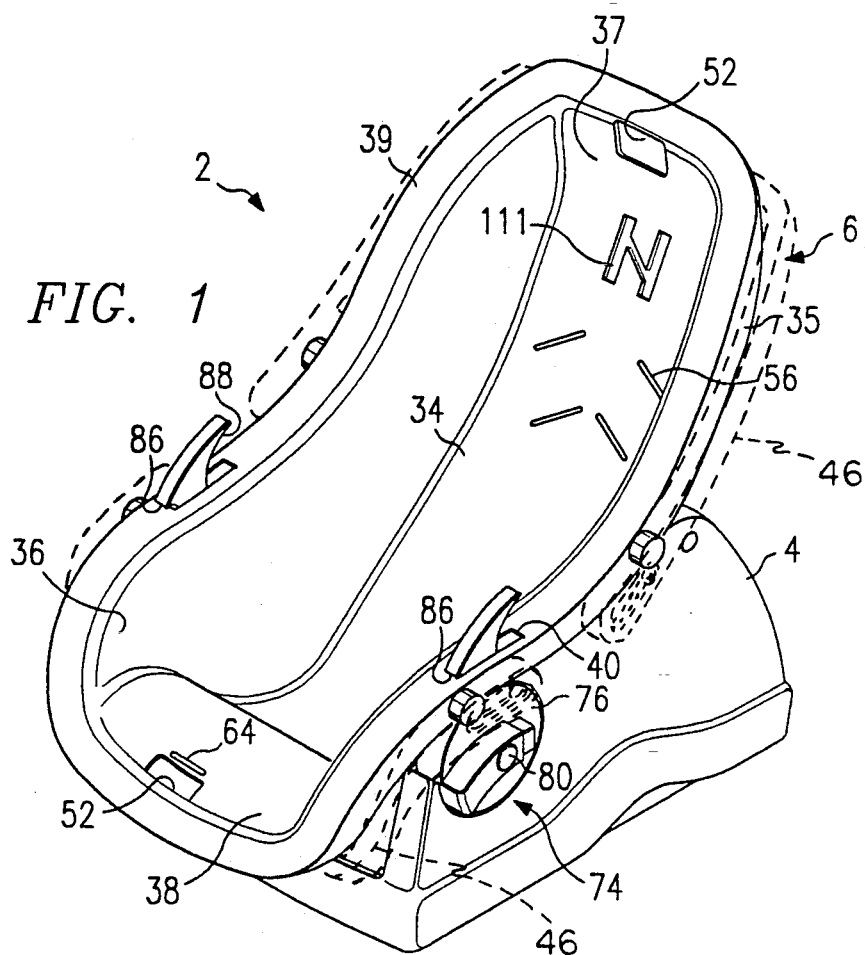
FIG. 1 is a perspective view of the infant seat of the present invention with the base and carrier in the locked position and the carrying handles connected to the carrier.
Figure 2:
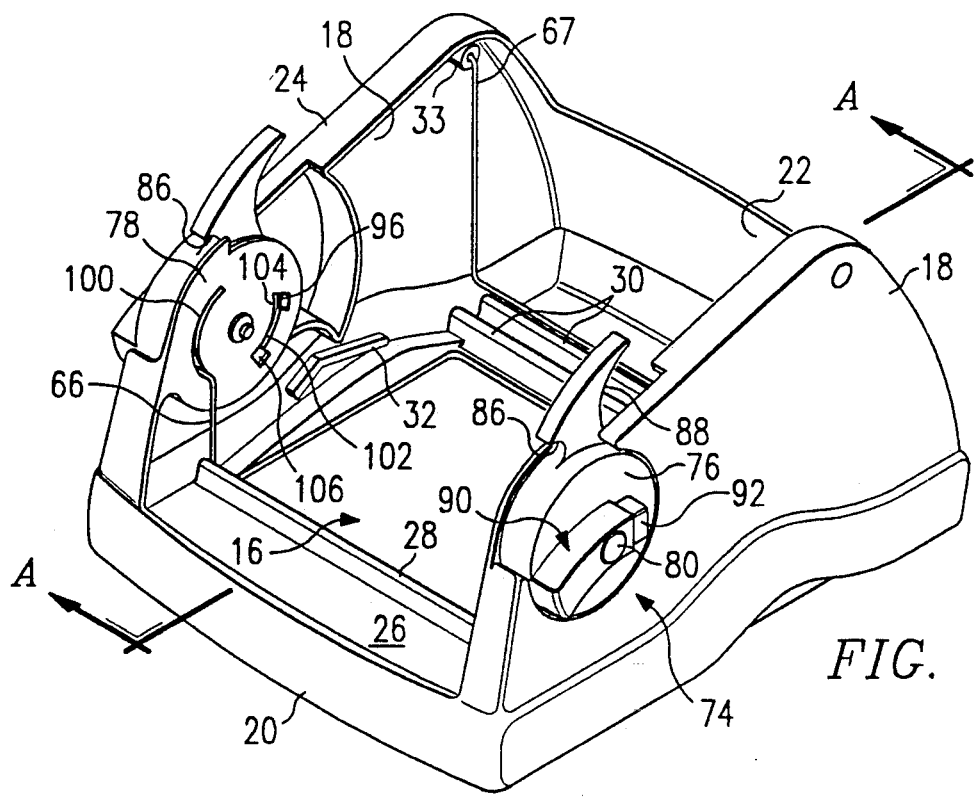
FIG. 2 is a perspective view of the base without the carrier with the adjusting assembly in its locked position.
Figure 3:
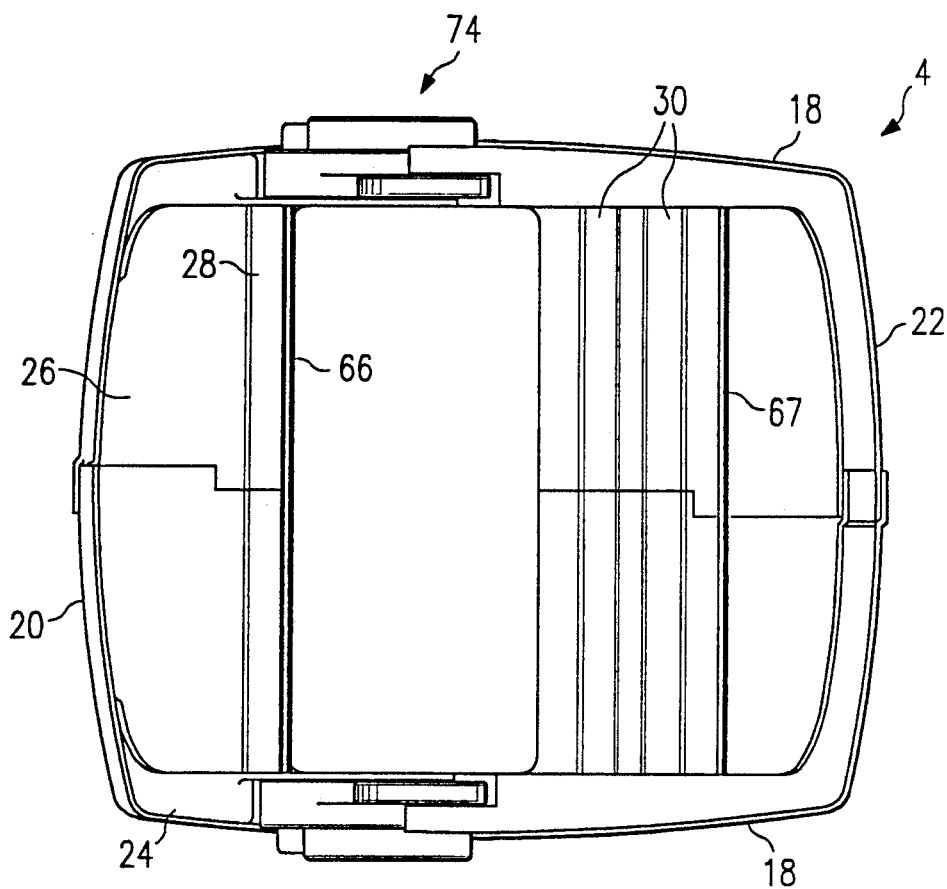
FIG. 3 is a top view of the base.
Figure 6:
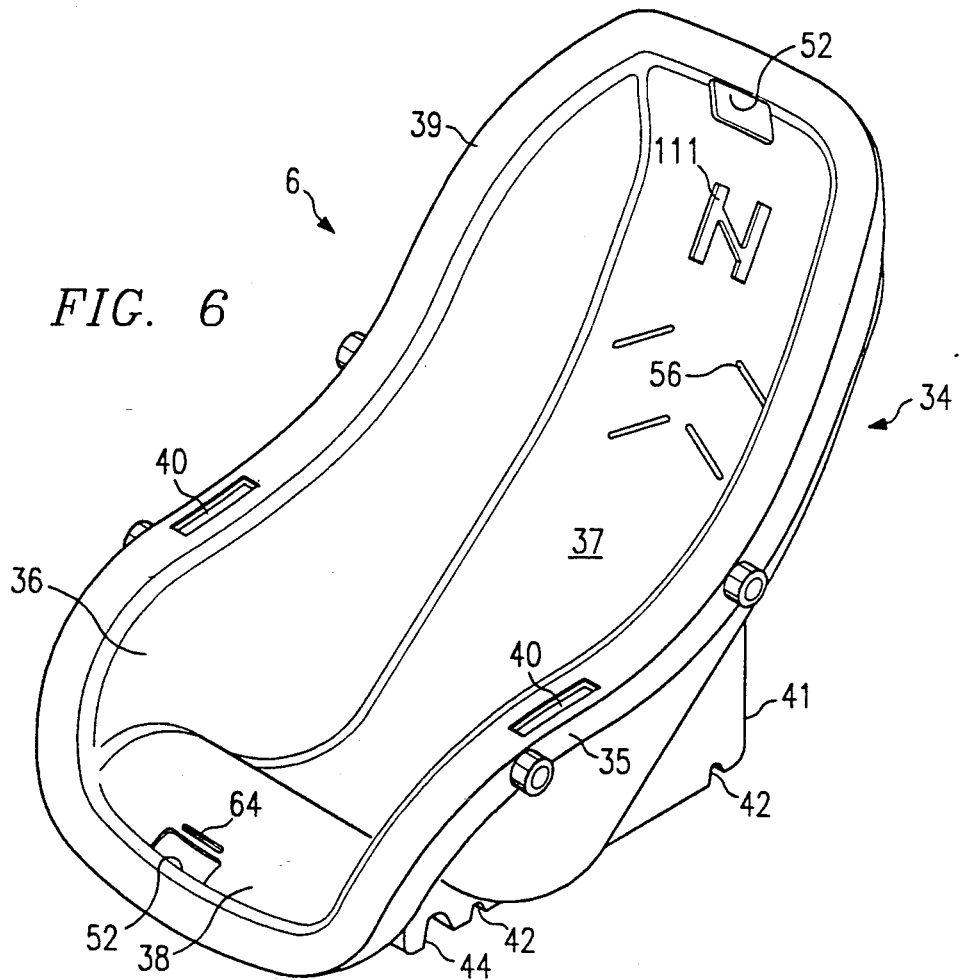
FIG. 6 is a perspective view of the carrier without the base.
Figure 11:
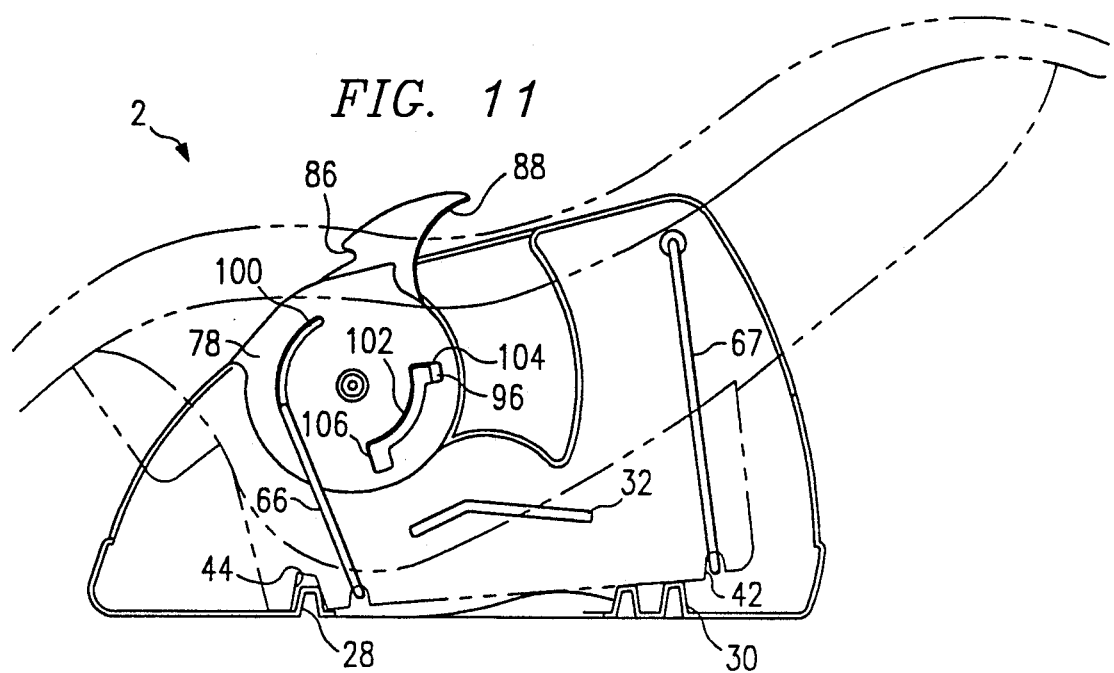
FIG. 11 is a side cutaway view of the infant seat in the locked configuration with the carrier being illustrated by phantom lines.
Figure 12:
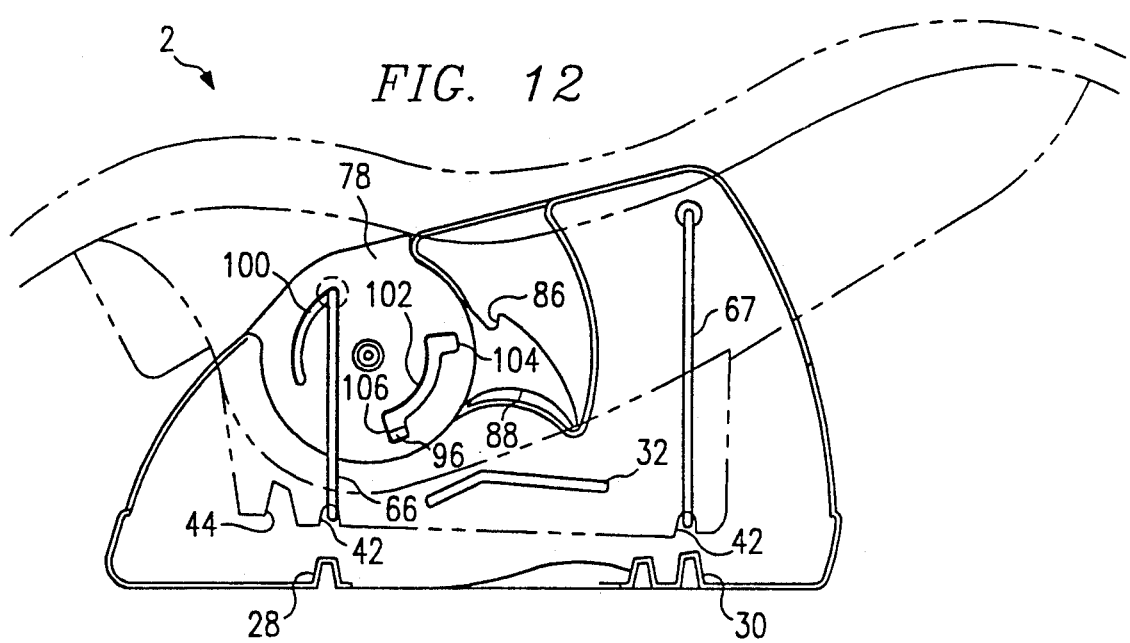
FIG. 12 is a side cutaway view of the infant seat in the glider or unlocked configuration with the carrier being illustrated by phantom lines.

In accordance with the present invention, FIG. 1 illustrates an infant seat 2 which includes a base assembly 4 having a cavity or an upwardly open receiving area 16, as best illustrated in FIG. 2, and a carrier assembly 6 which is connected to base assembly 4, as best illustrated in FIG. 6. The positioning of carrier assembly 6 with respect to base assembly 4 may be adjusted to allow the infant seat 2 to function as an infant carrier as illustrated in FIGS. 1 and 11, a glider as illustrated in FIG. 12, or a car seat as illustrated in FIG. 13.

The shape of base assembly 4, one of the primary components of the infant seat 2, is important in providing both the glider and car seat functions. The cavity 16 of the base assembly 4 at least partially contains carrier assembly 6. Referring to FIG. 2, cavity 16 is defined by two laterally displaced sidewalls 18 and front wall 20 and rear wall 22 which connect sidewalls 18. The heights of front wall 20 and rear wall 22 are less than that of sidewalls 18 to effectively form an open space or channel through which carrier assembly 6 may move longitudinally relative to base assembly 4 when the infant seat 2 is configured as a glider. In this regard, a base journal 33 is positioned in the upper, rear corner of each sidewall 18 to pivotally support rear swing support member 67 which in turn supports a portion of carrier assembly 6 as will be described in more detail below. Furthermore, motion limiters 32 are fixedly attached to each sidewall 18 to limit the rearward motion of front swing support member 66 and the forward motion of rear swing support member 67.

Figure 4:
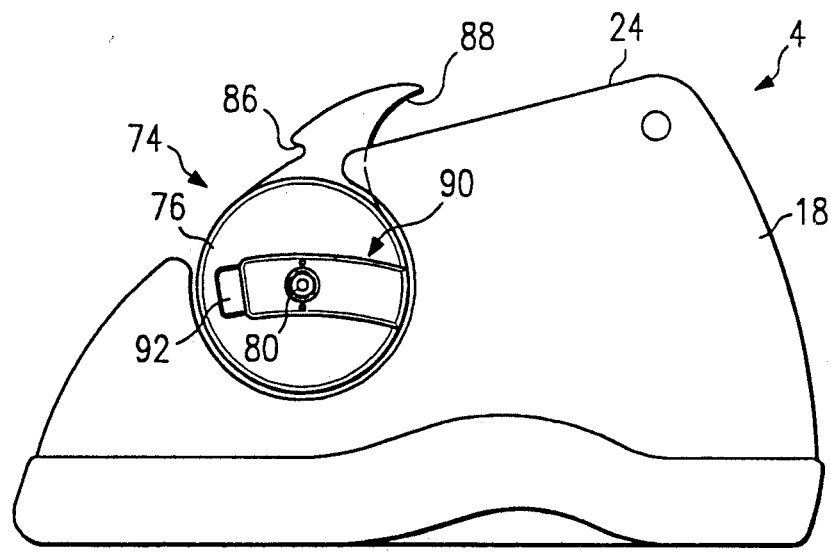
FIG. 4 is a side view of the base with the adjusting assembly in the locked position.

As best illustrated in FIG. 4, the upper portions of sidewalls 18 are downwardly inclined from the rear of base assembly 4 to its front. Fixedly attached to these upper portions of sidewalls 18 are carrier contacting surfaces 24 which are substantially perpendicular to sidewalls 18 and partially extend into cavity 16. When infant seat 2 is configured as an infant carrier or car seat, carrier contacting surfaces 24 engage with base contacting surfaces 39 of carrier 34 to partially support carrier assembly 6 within base assembly 4.

Although the general shape of base assembly 4 provides important features relating to the multi-functional nature of infant seat 2, other integral portions of base assembly 4 further assist in providing the infant carrier and car seat functions. Referring again to FIG. 2, bottom 26 of base assembly 4 is fixedly connected to the lowermost portions of sidewalls 18, front wall 20, and rear wall 22 to provide the support for infant seat 2 on suitable surfaces such as the seat of a motor vehicle or a floor. Portions of bottom 26 are also used to lock carrier assembly 6 to base assembly 4 and to directly support carrier assembly 6 when infant seat 2 is configured as an infant carrier or car seat. In this regard, restraining rail 28 transversely extends between sidewalls 18 in the front portion of base assembly 4 to engage with restraining slot 44 of carrier support 41 (see FIG. 6) to substantially restrict the longitudinal movement of carrier assembly 6 relative to base assembly 4. Bottom 26 further includes supporting rails 30 which transversely extend between sidewalls 18 in the rearward portion of base 4 to engage with rearward portions of carrier support 41 to further stabilize carrier assembly 6. Preferably, the upper surfaces of supporting rails 30 are beveled and the rear-most supporting rail 30 is slightly taller than the forward-most supporting rail 30, both of which function to improve stabilization of carrier assembly 6 within base assembly 4.

Figure 10:
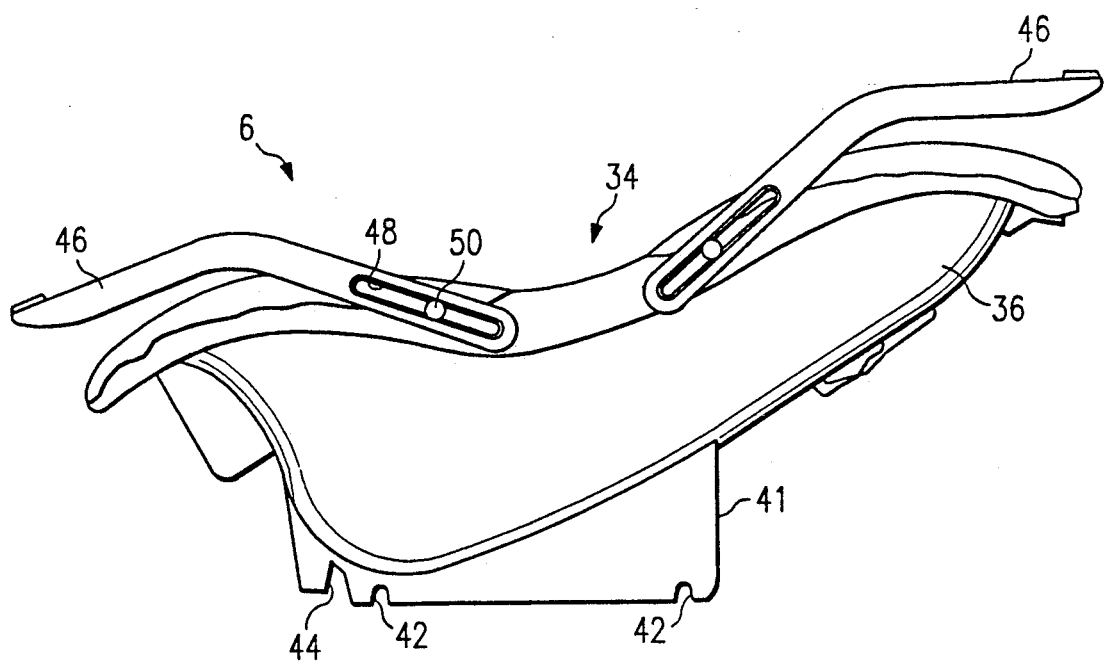
FIG. 10 is a side view of the carrier.

Carrier assembly 6 includes carrier 34 and carrier support 41, which is fixedly attached to the lower, exterior surface of carrier 34 as best illustrated in FIGS. 6 and 10. Carrier 34 functions to safely contain an infant therewithin while support slots 42 positioned on carrier support 41 are used in connecting the base assembly 4 to the carrier assembly 6.

Carrier 34 includes carrier sidewalls 36, back 37, and seat 38 to define a recess, as illustrated in FIG. 6, in which an infant may be positioned. Positioned around the perimeter of this recess are base contacting surfaces 39 which are fixedly attached to the upper portions of carrier sidewalls 36, back 37, and seat 38 and extend outward from the recess formed thereby. Portions of base contacting surfaces 39 engage with carrier contacting surfaces 24 of base assembly 4 when infant seat 2 is configured as an infant carrier or car seat. Adjusting assembly slots 40 extend through portions of base contacting surfaces 39 to allow seat belt receivers 88 and locking notch 86 to extend therethrough as will be discussed in more detail below.

Figure 7:
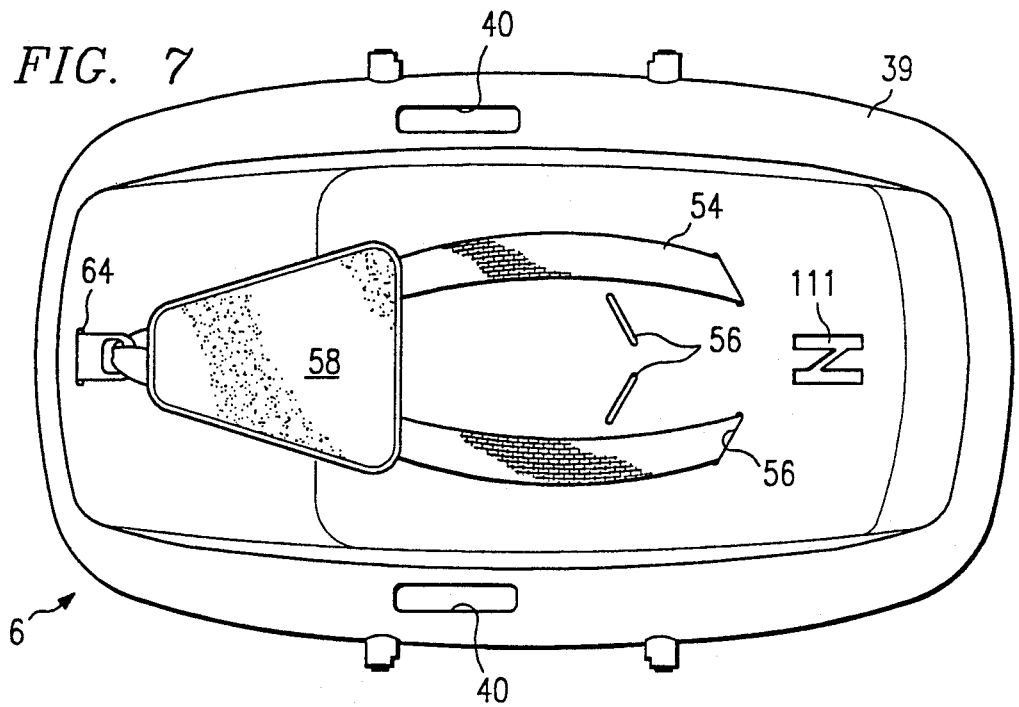
FIG. 7 is a top view of the carrier.
Figure 8:
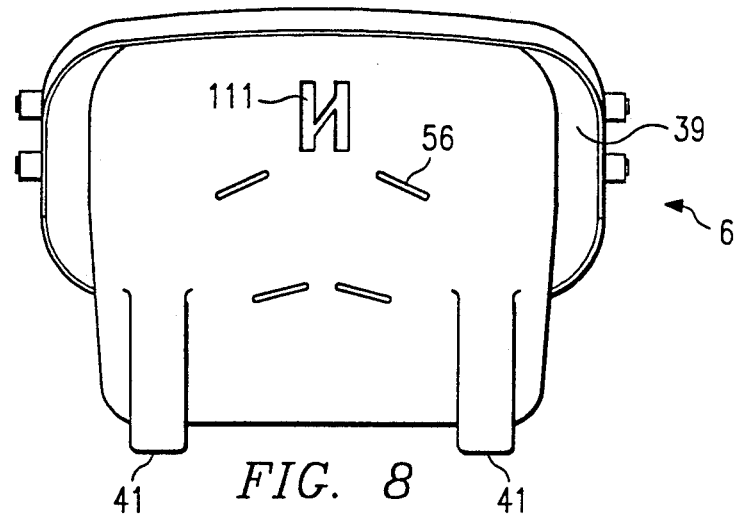
FIG. 8 is a rear view of the carrier.

Referring to FIGS. 1 and 7, shoulder harness 54 of a type commonly known in the art is included with carrier 34 to safely restrain an infant within carrier 34. Shoulder harness 54 extends through harness slots 56 on back 37 and engages with tongue slot 64 on the forward portion of seat 38 for detachable engagement with a locking mechanism of the type commonly known in the art (not shown). A plurality of harness slots 56 are provided on back 37 to adjust for the height of the infant. A pad 58 is included with shoulder harness 54 to further comfort the infant when properly restrained within carrier 34.

Referring to FIG. 10, carrier 34 also includes two handles 46 which are rotatably connected to carrier 34 at locations substantially equidistant from its center of gravity. More particularly, the rotatable connection is provided by two handle pins 50 which pass through extension surfaces 35, a downward extension of base contacting surfaces 39, and handle slots 48 on each handle 46.

Handle slots 48 allow handles 46 to assume a number of positions. Handles 46 may be placed in a locked position under portions of base contacting surfaces 39 of carrier 34 by extending handles 46 past the ends of carrier 34 as a result of handle pins 50 sliding in handle slots 48, pivoting handles 46 down past portions of extension surfaces 35, and sliding handles 46 inwardly, again as a result of handle pins 50 sliding in handle slots 48, where they may then be locked to carrier 34 by a mechanism not shown. Handles 46 may also assume a position above the recess of carrier 34 for use in carrying an infant held by the infant car seat 2. In order to achieve this position, handles 46 are extended out past the ends of carrier 34, again as a result of the slidable engagement of handle pins 50 with handle slots 48, and then rotated upwardly to a position above the cavity of carrier 34. Handles 46 may be locked together in the second position for more convenient carrying of carrier 34. As an alternative to using handles 46 for transporting carrier 34, carrier 34 further includes hand slots 52 which are positioned on portions of back 37 and seat 38 as best illustrated in FIGS. 1 and 6.

Carrier support 41 is integral with the lower portion of carrier 34 and includes portions for use in connecting base assembly 4 to the carrier 34. The lower surface of carrier support 41 includes support slots 42 for receipt of front and rear swing support members 66, 67. The lower surface also includes a restraining slot 44 for engagement with restraining rail 28 of base assembly 4.

The manner by which carrier assembly 6 and base assembly 4 are interconnected depends upon the particular configuration of infant seat 2, i.e., whether configured as an infant carrier, glider, or car seat. When configured as an infant carrier or car seat, the carrier assembly 6 is substantially immovable relative to the base assembly 4 due to the interconnection between the bottom of the carrier support 41, particularly restraining slot 44, and the restraining rail 28 of base assembly 4. When configured as a glider, this particular interconnection is not present to permit the gliding motion.

More specifically, when configured as a glider, carrier assembly 6 is essentially suspended within cavity 16 of base assembly 4 by the two longitudinally displaced front and rear swing support members 66, 67 extending between sidewalls 18 of base assembly 4 as illustrated in FIG. 2. The rear swing support member 67 is pivotally connected to the rear, upper portion of each sidewall 18 at base journals 33 which are fixedly attached to sidewalls 18. The front swing support member 66 is pivotally attached to adjusting knob 76 of adjusting assembly 74 which is in turn rotatably attached to the front, upper portions of each sidewall 18. When performing the gliding function, front swing support member 66 must be in its uppermost vertical position, namely when latch 96 is in lower receiver 106 as will be described below in the discussion of adjusting assembly 74.

Figure 14:
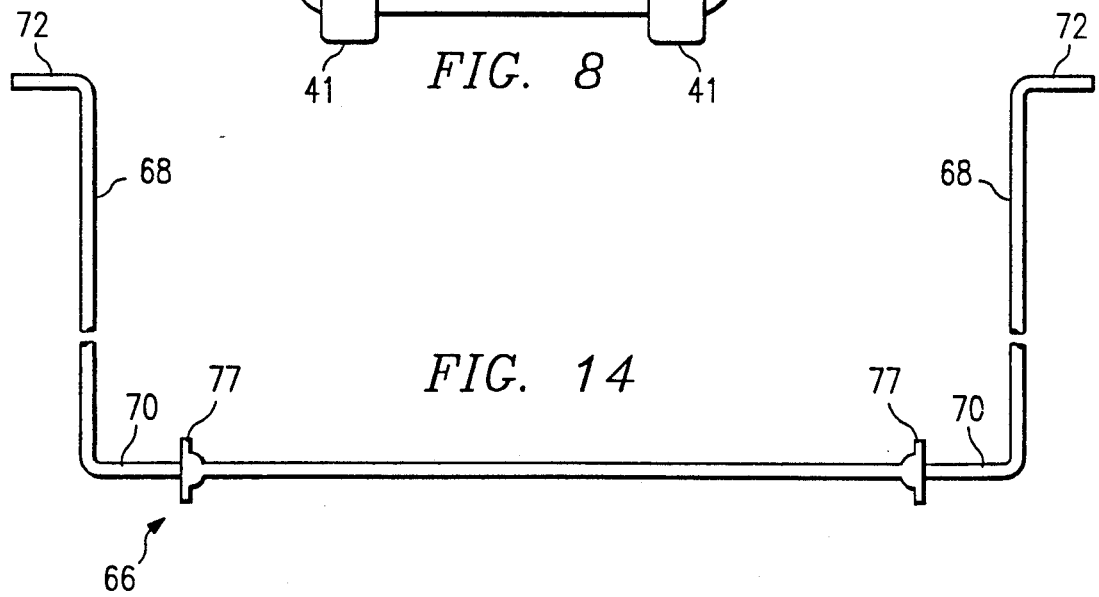
FIG. 14 is a front view of a swing support member used to suspend the carrier within the base.
Figure 9:
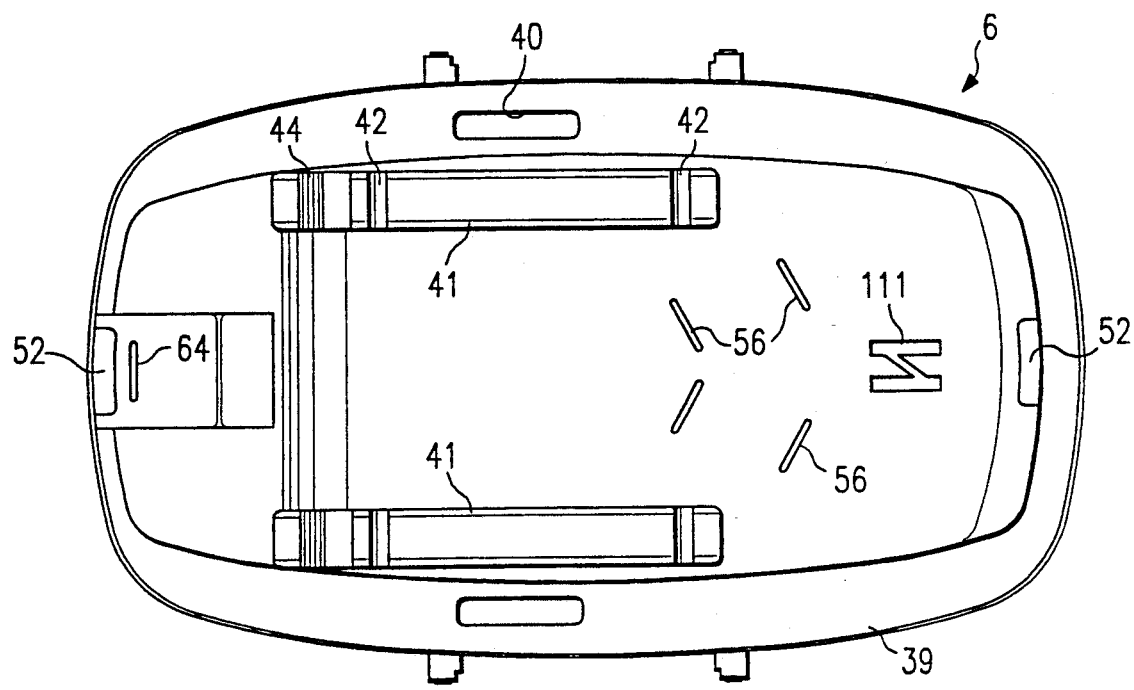
FIG. 9 is a bottom view of the carrier.

The shape of front and rear swing support members 66, 67 is important in allowing infant seat 2 to function as a glider. As best illustrated in FIG. 14, both front and rear swing support members 66, 67 are substantially U-shaped and are defined by two laterally displaced and substantially vertical first sections 68, a substantially horizontal second section 70 positioned therebetween, and two substantially horizontal third sections 72 which extend outwardly from the upper portions of each first section 68. The substantially horizontal second sections 70 are the portions of front and rear swing support members 66, 67 which join with the front and rear support slots 42, respectively, on carrier support 41 to suspend carrier assembly 6 within cavity 16 of base assembly 4. The two substantially horizontal third sections 72 are the portions of front and rear swing support members 66, 67 which are pivotally attached to each adjusting knob 76 and to base journals 33 on sidewalls 18, respectively. While the swing support members 66, 67 have been described in sections, each is preferably of unitary construction.

Provided with each of the swing support members 66, 67 are two swedge devices 77 that are disposed on each horizontal second section 70 at opposite ends thereof. These swedge devices 77 act to limit swaying or unwanted lateral movement of the carrier assembly 6 relative to the base assembly 4. That is, each swedge device 77 is located on the second section 70 so that it is adjacent to a portion of the carrier support 41 whereby it contacts the support 41 to prevent undesired lateral movement. To fixedly attach the front and rear swing support members 66, 67 to the bottom of the carrier support 41 in the support slots 42, a locking device (not shown), such as a wire clip, is utilized that is held in each slot and prevents the escape or removal of the front and rear swing support members 66, 67. As also can be understood, e.g., with reference to FIGS. 11 and 12, the front and rear swing support members 66, 67 are not of the same size, with rear swing support member 67 being longer than front swing support member 66. This difference in length results in proper glider motion and contributes to achieving the desired inclined positioning of the carrier assembly 6 when it is immovable relative to the base assembly 4.

In order to convert infant seat 2 from its glider function so that it is able to function as a car seat or an infant carrier, the above-described interconnection between carrier assembly 6 and base assembly 4 must be modified. Adjusting assembly 74 is used to alter the vertical orientation of the front swing support member 66 to establish the modified connection between carrier assembly 6 and base assembly 4.

Figure 5:
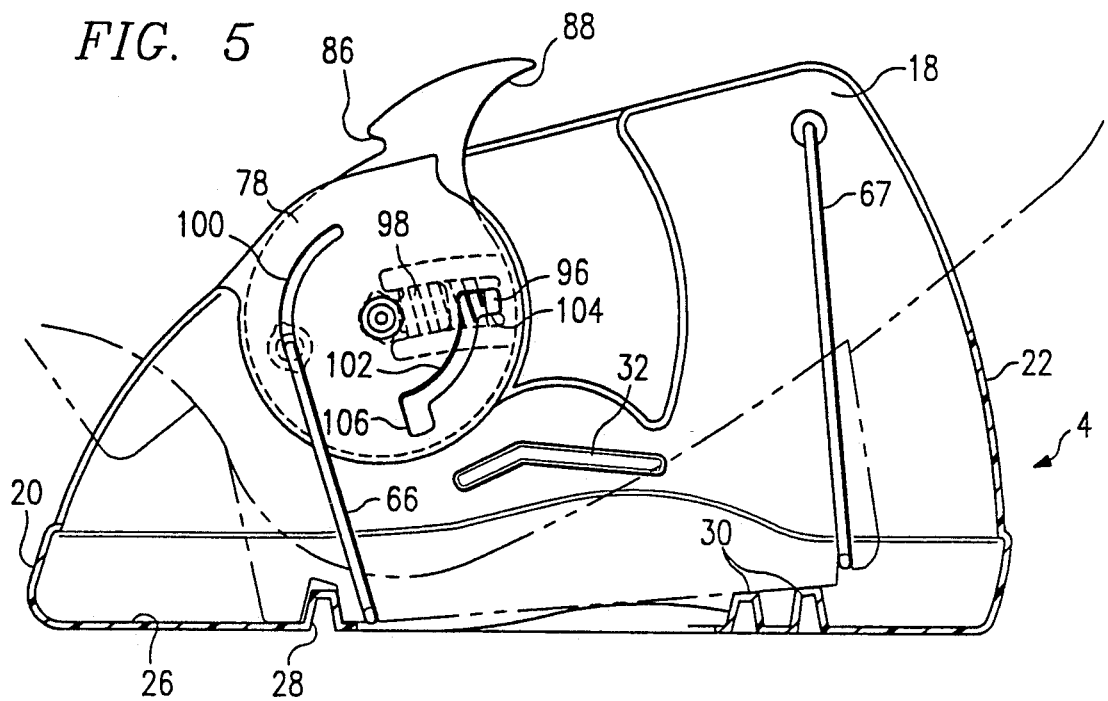
FIG. 5 is a longitudinal cross-sectional view of the base along line A—A of FIG. 2 with the adjusting assembly in the locked position and the bottom portion of the carrier and the carrier support being illustrated by phantom lines.

Referring to FIGS. 2 and 5, adjusting assembly 74, which is rotatably attached to the front, upper portion of each sidewall 18 on the exterior surface thereof, includes an adjusting knob 76 and actuator assembly 90 which is fixedly attached to the exterior surface of each adjusting knob 76. Each adjusting knob 76 is rotatably attached to base mounting 78, which is provided with each sidewall 18, using an adjusting handle pin 80.

Rotation of adjusting knob 76 is achieved by activation of actuator assembly 90 which includes button 92, latch 96 which is substantially perpendicularly connected to button 92, and spring 98 which exerts a seating force on latch 96 and button 92. Latch 96 extends through latch slot 102, which is integrally formed in base mounting 78, and is locked into one of two positions at extreme ends of latch slot 102 by spring 98, namely by insertion at either upper or lower receivers 104, 106, respectively. In order to rotate adjusting knob 76 to adjust the position of the front swing support member 66, button 92 must be pushed, which thus compresses spring 98 to allow latch 96 to exit either of the upper or lower receivers 104, 106 and travel in latch slot 102 to the opposite upper or lower receiver 104, 106. When functioning as a car seat or infant carrier, latch 96 must be seated in upper receiver 104 to put front swing support member 66 in its lowermost vertical position to assist in locking carrier assembly 6 within base assembly 4.

As previously described, front swing support member 66 is pivotally attached to each adjusting knob 76 at a position radially outward from its rotational axis. In order to enable front swing support member 66 to follow the rotation of adjusting knob 76 and hence change its vertical position, base mounting slot 100 is also formed in each base mounting 78. With reference also to FIGS. 15 and 16, the receipt of the horizontal third section 72 of the front swing support member 66 into a base mounting slot 100 is best seen. In this position, the front swing support member 66 is in its highest vertical position so that the gliding function is achievable.

After rotation of adjusting knobs 76 to position front swing support member 66 in its lowermost vertical position, namely when latch 96 is positioned in upper receiver 104, restraining slot 44 of carrier support 41 engages with restraining rail 28 of base assembly 4 which substantially restricts longitudinal movement of carrier assembly 6 relative to base assembly 4. Rear portions of carrier support 41 establish contact with supporting rails 30 to further stabilize carrier assembly 6 within base assembly 4.

The engagement of restraining slot 44 of carrier support 41 with restraining rail 28 of base assembly 4 forms part of the locking assembly of the present invention, again by substantially restricting the longitudinal movement of the carrier assembly 6 relative to base 4. Swedge devices 77 on front and rear swing support members 66, 67 again serve to substantially restrict the lateral movement of carrier assembly 6 relative to base assembly 4. Furthermore, rotation of adjustment knobs 76 causes locking notch 86, which is fixedly attached to each adjusting knob 76, to extend up through adjusting assembly slots 40 and engage with an upper portion of the base contacting surfaces 39 of carrier 34 to substantially restrict the vertical movement of carrier assembly 6 relative to base assembly 4. The restraining rail 28 also contributes to stabilize vertical motion of the carrier assembly 6.

In addition to assisting in the locking function, rotation of the adjusting knobs 76 also assists in achieving the car seat configuration. Rotation of adjusting knobs 76 causes seat belt receivers 88, which are fixedly attached to each adjusting knob 76, to extend up through adjusting assembly slots 40 above the upper surface of portions of base contacting surfaces 39 of carrier 34 so that a suitable restraint mechanism may be used to secure the infant seat 2 to the seat of an automobile. Alternatively, to function as an infant carrier, the carrying handles 46 are detached from the front and rear of the infant seat 2 so that it can readily be carried using the handles 46.

The above described configuration of components and their interaction allows infant seat 2 to possess its multi-functional characteristics of being able to perform as an infant seat, glider, or car seat. In operation as a glider, carrier assembly 6 is freely suspended within the cavity of base assembly 4 by means of front and rear swing support members 66, 67 in a position above restraining rail 28 and supporting rails 30 as illustrated in FIG. 12. By exerting a force on carrier assembly 6, limited longitudinal, oscillatory motion of the carrier assembly 6 relative to the base assembly 4 is achievable. Movement of a child placed within the carrier assembly 6 may also activate some motion. The range of motion is limited by the motion limiters 32 which are fixedly attached to each sidewall 18 to limit the rearward motion of front swing support member 66 and the forward motion of rear swing support member 67.

In order to configure infant seat 2 as a car seat or an infant carrier, actuator assembly 90 is activated and adjusting knob 76 is rotated to place front swing support member 66 in its lowermost vertical position as illustrated in FIG. 11, namely so latch 96 engages with upper receiver 104. The engagement of restraining slot 44 of carrier support 41 with restraining rail 28 of base assembly 4 substantially restricts the longitudinal movement of the carrier assembly 6 relative to base assembly 4. Finally, the rotation of adjusting knobs 76 also causes each locking notch 86 to engage the upper surface of carrier 34 to substantially restrict the vertical movement of carrier 34 relative to base assembly 4. Rotation of adjusting knobs 76 further causes seat belt receivers 88 to emerge through adjusting assembly slots 40 so that a seat belt may be appropriately positioned to secure infant seat 2 to a seat of an automobile.

When in the above-described locked position, infant seat 2 may be transported to a motor vehicle by placing the hands in hand slots 52 or by using handles 46 as described above. Thereafter, infant seat 2 may be placed on the seat of a motor vehicle facing rearwardly as illustrated in FIG. 13. An infant may then be positioned within the recess of the carrier 34 and the motor vehicle restraint mechanism may be placed over the carrier 34 and under seat belt receivers 88 to secure infant seat 2 to the vehicle seat. Additionally, where the vehicle restraint mechanism includes a shoulder strap, this strap can be attached to the infant seat 2 by means of a clip-device 111, as illustrated, for example, in FIG. 1. The device 111 may be integrally formed with the infant seat back 37 and includes openings for receiving inserted portions of the shoulder strap.

Although the present invention has been described with respect to a specific preferred embodiment thereof, various changes and modifications may be suggested to one skilled in the art, and it is intended that the present invention encompass such changes and modifications as fall within the scope of the claims which follow below.

What is claimed is:

1. A multi-function infant car seat apparatus operable as a glider in a first mode of operation and operable as a car seat in a second mode of operation, comprising:
   a) a base having a cavity;
   b) a carrier connected to and located in a position relative to said base and being at least partially contained within said cavity;
   c) adjusting means connecting said base and said carrier, wherein said adjusting means is movable between first and second adjusting means positions for altering the position of said carrier relative to said base between at least a first carrier position for operation in said first mode of operation and a second carrier position for operation in said second mode of operation;
   d) glider means connecting said carrier and said base when said adjusting means is in said first adjusting means position, wherein said carrier is suspended within said cavity and able to glide relative to said base in said first mode of operation;
   e) locking means connecting said carrier and said base in said second mode of operation, said locking means operating in response to movement of said adjusting means to said second adjusting means position, wherein said locking means substantially prevents movement of said carrier relative to said base in said second mode of operation; and
   f) securing means for receiving vehicle restraint means.

2. An apparatus, as claimed in claim 1, wherein said cavity is defined using two laterally displaced side walls.

3. An apparatus, as claimed in claim 1, wherein said carrier further includes harness means for securing an infant in the seat.

4. An apparatus, as claimed in claim 1, wherein said adjusting means includes an adjusting knob and means for locking said adjusting knob in at least one of said first and said second positions.

5. An apparatus, as claimed in claim 1, wherein said glider means includes at least two swing support members connected to said base, wherein each of said swing support members supports a portion of said carrier.

6. An apparatus, as claimed in claim 1, wherein said glider means includes means for altering the vertical position of at least a portion of said glider means relative to said base.

7. An apparatus, as claimed in claim 1, wherein said carrier further includes at least two hand slots for transporting said carrier.

8. An apparatus, as claimed in claim 1, wherein said locking means includes a restraining rail disposed on the bottom of said base.

9. An apparatus, as claimed in claim 1, wherein said locking means further includes a locking member attached to said adjusting means adjacent to an upper surface of said carrier.

10. An apparatus, as claimed in claim 1, wherein said glider means includes first and second swing support members connected to said base, said first and second swing support members including a pair of legs and said pair of legs of said second swing support member is no longer than said pair of legs of said first swing support member.

11. An apparatus, as claimed in claim 1, wherein said carrier includes means defining a slot and said securing means is movable relative to said slot such that said securing means is disposed inwardly of said slot in said first mode of operation and said securing means is disposed outwardly of said slot in said second mode of operation.

12. An apparatus, as claimed in claim 1, wherein said carrier includes handle means.

13. An apparatus, as claimed in claim 12, wherein said handle means includes a handle having a slot located near where said handle is connected to said carrier, said handle being pivotally connected to said carrier.

14. An apparatus, as claimed in claim 13, wherein said handle means includes a pin, wherein said pin is positionable along said slot so that said handle can be locked in at least two positions.

15. An apparatus, as claimed in claim 1, wherein said adjusting means includes an adjusting knob that is rotatably attached to said base.

16. An apparatus, as claimed in claim 15, wherein said adjusting means further includes a swing support member attached to said adjusting knob, and wherein said swing support member supports a portion of said carrier.

17. An apparatus, as claimed in claim 16, wherein said adjusting means includes a slot formed in said base and a portion of said swing support member is held in said slot and wherein said portion moves along said slot when said adjusting knob is rotated whereby said carrier moves relative to said base.

18. An apparatus, as claimed in claim 1, wherein said securing means is fixedly attached to said adjusting means and extends up through slot means formed in said carrier.

19. An apparatus, as claimed in claim 18, wherein said adjusting means includes a rotatable adjusting knob and said securing means is joined to said adjusting knob, wherein said securing means rotates with said adjusting knob.

20. An apparatus, as claimed in claim 19, wherein said securing means includes first and second sides, with said first side engaging portions of the vehicle restraint mechanism and said second side engaging an upper surface portion of said carrier.

21. An apparatus, as claimed in claim 1, wherein said locking means includes a restraining slot formed in the lower, exterior surface of said carrier.

22. An apparatus, as claimed in claim 21, wherein said locking means includes a restraining rail disposed on the bottom of said base which engages with said restraining slot on the bottom of said carrier.

23. A multi-function infant car seat apparatus, comprising:

a) a base having a cavity;
b) a carrier connected to said base and being at least partially contained within said cavity;
c) adjusting means including a rotatable adjusting knob connecting said base and said carrier, wherein said adjusting means is movable between first and second adjusting means positions for altering the position of said carrier relative to said base between at least a first position and a second carrier position;
d) glider means connecting said carrier and said base when said adjusting means is in said first adjusting means position, wherein said carrier is suspended within said cavity and able to glide relative to said base;
e) locking means connecting said carrier and said base when said adjusting means is in said second adjusting means position, wherein said locking means substantially prevents movement of said carrier relative to said base; and
f) securing means attached to said adjusting knob, wherein said securing means rotates with said adjusting knob to a position for receiving a vehicle restraint means.

* * * * *

UNITED STATES PATENT AND TRADEMARK OFFICE
CERTIFICATE OF CORRECTION

PATENT NO. : 5,277,472

DATED : January 11, 1994

INVENTOR(S) : T. Brent Freese et al

It is certified that error appears in the above-identified patent and that said Letters Patent is hereby corrected as shown below:

Column 12, line 35, "no" should be deleted.

Signed and Sealed this

Thirty-first Day of May, 1994

*Attest:*

BRUCE LEHMAN

*Attesting Officer*     *Commissioner of Patents and Trademarks*